Patented Aug. 28, 1928.

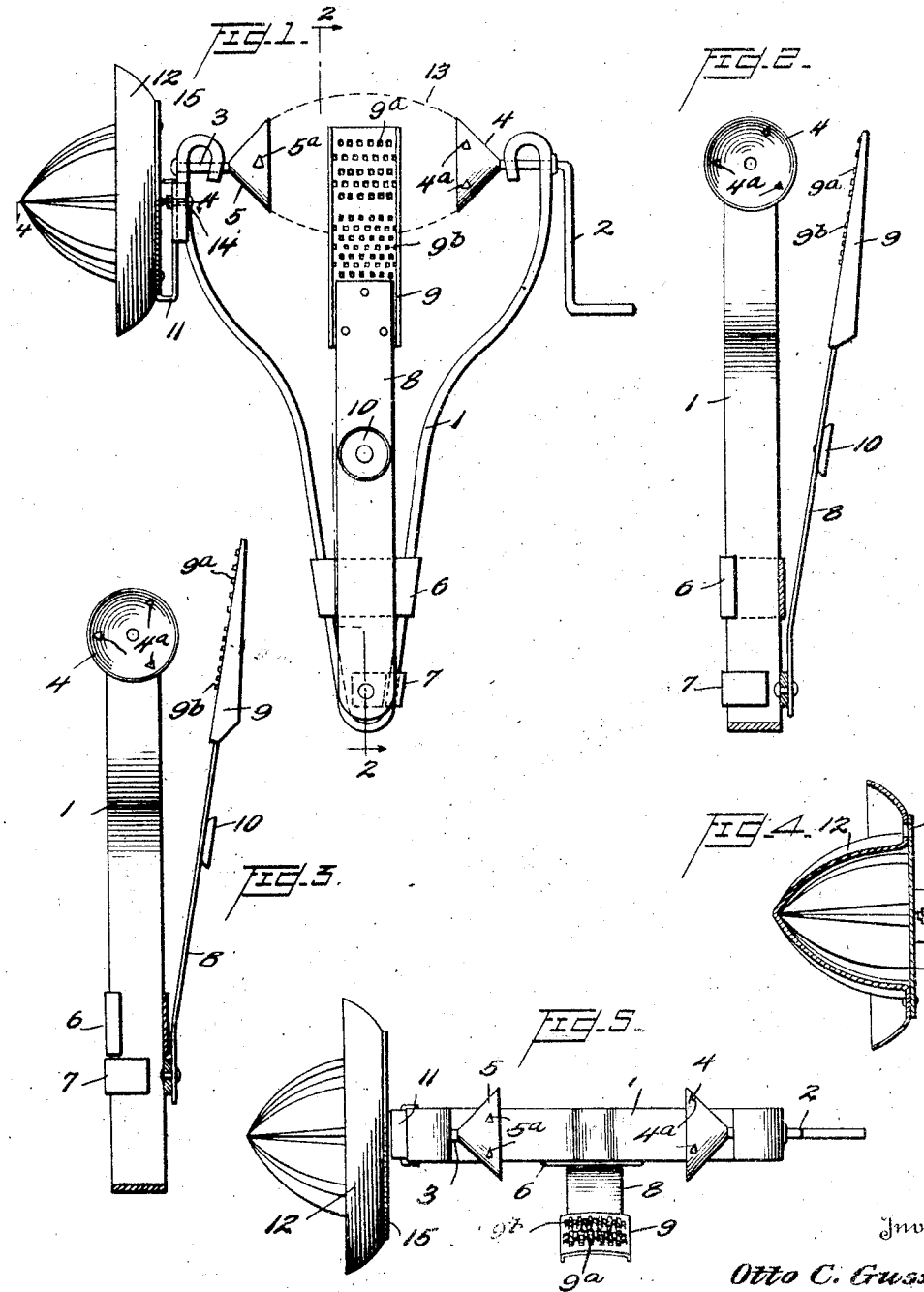

1,682,274

UNITED STATES PATENT OFFICE.

OTTO C. GUSSNER, OF MANDAN, NORTH DAKOTA.

GRATER AND REAMER FOR CITRUS FRUITS.

Application filed October 8, 1927. Serial No. 224,937.

My invention relates broadly to kitchen utensils and more particularly to a combination kitchen tool in the form of a grater and reamer for citrus fruits.

One of the objects of my invention is to provide a simplified construction of grater and reamer for citrus fruits which may be inexpensively manufactured on a quantity production scale.

Another object of my invention is to provide a construction of grater and reamer for citrus fruits having parts constructed of sheet metal with means for varying the size of the grated particles from the citrus fruit.

Still another object of my invention is to provide a hand tool in which a citrus fruit may be gripped and grating means of a selected size applied to the citrus fruit while the fruit is rotated under control of a rotary actuator for abrasive action with respect to the grating means.

A further object of my invention is to provide a combined tool by which citrus fruits may be grated and reamed for the extraction of juice by the same hand tool.

Other and further objects of my invention reside in the construction of the tool from sheet metal parts, as will be more fully understood from the specification hereinafter following by reference to the accompanying drawings in which:

Figure 1 is a side elevation showing the arrangement of parts of the hand tool; Fig. 2 is a longitudinal cross-sectional view through the hand tool taken on line 2—2 of Fig. 1 and showing the position of the grating device with respect to the position which may be occupied by a citrus fruit in the hand tool; Fig. 3 shows the position of the grating device for operating upon citrus fruit and reducing the skin thereof to particles of a different size; Fig. 4 is a cross-sectional view through the citrus fruit reamer; and Fig. 5 is a top plan view of the grater and reamer constructed in accordance with my invention.

Referring to the drawings in detail reference character 1 designates a resilient metal frame structure having a pair of arms extending vertically with crank member 2 rotatably journaled at the extremity of one of the arms and a stub shaft 3 rotatably journaled at the extremity of the other arm. Cone shaped members 4 and 5 are secured to the extremities of the crank member 2 and stub shaft 3, respectively. Each cone shaped member is provided with inwardly directed teeth $5^a$ and $4^a$ for gripping a citrus fruit between the cone shaped members. A clamp 6 is provided for varying the spacial relation of the arms constituting the member 1, and springing the arms together for clamping a citrus fruit between the cone shaped members 4 and 5.

The grater consists of a member 9 having different sizes of grating teeth represented at $9^a$ and $9^b$. The grater is carried by strip member 8 which may be adjusted with respect to the frame 1 by means of the strap 7 which grips over the frame 1 and slides with respect thereto to bring the teeth $9^a$ into a position of abrasion with respect to a citrus fruit which I have designated at 13 or bring the teeth $9^b$ into abrasive action with the citrus fruit. A hand tube 10 is provided to enable the grater to be pressed in the direction of the citrus fruit.

In Fig. 2 I have shown the grater in its lowermost position with teeth $9^a$ adjacent the citrus fruit, while in Fig. 3 I have shown the grater elevated to its uppermost position with the teeth $9^b$ thereof arranged for abrasive action with respect to the citrus fruit 13.

A bracket 11 is secured by means of bolt member 14 adjacent the upper end of one of the arms of the spring device 1. The bracket 11 terminates in a plate 15 to which is riveted the reamer 12.

The grater and reamer of my invention is particularly adapted for grating and reaming citrus fruit. The fruit is positioned between the cone shaped members 4 and 5 and the arms of the frame 1 closed upon the fruit with the frame 1 in the left hand. The clamp 6 is moved upwardly with the right hand so that the fruit will be held firmly in its place between the cones 4 and 5. The grater is moved upwardly by pressing the left hand against the knob 10 with the left thumb on the button 10 so that the grater rests on the fruit 13. The crank 2 is then revolved with the right hand and while the fruit is rotating the grater 9 abrades the surface of the fruit removing particles from the rind. If very fine particles are desired then the teeth $9^b$ of the grater will be moved to a position for abrading the rind of the fruit, whereas if larger size particles of the rind are to be secured then the teeth $9^a$ of the grater will be used against the rind of the fruit. After the grating action the fruit may be removed from the cones 4 and 5 by sliding the clamp 6 downwardly on the frame 1 and one end of the fruit cut off and the fruit pressed against the reamer 12 for the extraction of the juice. The reamer 12 and plate 15 have corresponding apertures as represented at 16 to permit the free flow of the juice to a container when the entire device is held over a tumbler or bowl to catch the juice.

The grater and reamer has been found to be extremely practical in its construction and successful in use, and while I have described one of the preferred embodiments of my invention I desire that it be understood that modifications may be made and that no limitations are intended other than are imposed by the scope of the appended claims.

What I claim as new and desire to secure by Letters Patent of the United States is as follows:

1. A grater for citrus fruits comprising a metallic yoke, a pair of rotatable cone shaped devices journaled adjacent the upper ends of said yoke, means for imparting rotative movement to one of said cone shaped devices, means for shifting the ends of said yoke toward each other for clamping a citrus fruit between said cone shaped devices, and a grater comprising a strip having various sizes of grating teeth thereon, and means for varying the position of said grater with respect to the citrus fruit clamped between said cone shaped devices for subjecting the rind of the citrus fruit to abrasive action for the removal of selected sizes of particles of the rind.

2. A grater for citrus fruits comprising a metallic yoke shaped member, bearings formed adjacent the upper extremities of the arms of said yoke shaped member, rotatable cone shaped devices journaled in said bearings on the same axial line, a crank for imparting rotative movement to one of said cone shaped devices, means for shifting the arms of said yoke shaped member with respect to each other for clamping a citrus fruit between said cone shaped devices, and a grater comprising a strip member positioned in a plane at right angles with respect to the plane of the peripheral edges of said cone shaped devices, said grater being shiftable into engagement with the citrus fruit in a plane substantially perpendicular to the axis of said rotatable cone shaped devices for abrasive action with respect to the rind for removing particles of selected sizes from the rind.

In testimony whereof I affix my signature.

OTTO C. GUSSNER.